(12) United States Patent
Sugiura et al.

(10) Patent No.: US 7,801,014 B2
(45) Date of Patent: Sep. 21, 2010

(54) MANUFACTURING METHOD OF OPTICAL DISC AND OPTICAL DISC

(75) Inventors: Yoshihiro Sugiura, Shizuoka (JP); Takeshi Koitabashi, Shizuoka (JP)

(73) Assignee: Sony Disc & Digital Solutions Inc. (JP)

( * ) Notice: Subject to any disclaimer, the term of this patent is extended or adjusted under 35 U.S.C. 154(b) by 791 days.

(21) Appl. No.: 11/791,284

(22) PCT Filed: Nov. 17, 2005

(86) PCT No.: PCT/JP2005/021498

§ 371 (c)(1),
(2), (4) Date: May 22, 2007

(87) PCT Pub. No.: WO2006/054782

PCT Pub. Date: May 26, 2006

(65) Prior Publication Data

US 2008/0037402 A1 Feb. 14, 2008

(30) Foreign Application Priority Data

Nov. 22, 2004 (JP) .............................. 2004-337205

(51) Int. Cl.
*G11B 7/24* (2006.01)
(52) U.S. Cl. ............... 369/275.1; 369/286; 369/275.3; 369/283; 428/64.1; 428/64.2
(58) Field of Classification Search ........................ None
See application file for complete search history.

(56) References Cited

U.S. PATENT DOCUMENTS

| 6,117,284 A | * | 9/2000 | Mueller ................. 204/192.27 |
| 6,309,496 B1 | * | 10/2001 | Van Hoof ................... 156/230 |
| 2003/0179693 A1 | | 9/2003 | Ootera |
| 2004/0190433 A1 | | 9/2004 | Hisada et al. |
| 2005/0158500 A1 | * | 7/2005 | Kitano et al. ............... 428/40.1 |

FOREIGN PATENT DOCUMENTS

| FR | 2871614 | | 12/2005 |
| JP | 2002-216398 | A | 8/2002 |
| JP | 2002-260307 | A | 9/2002 |
| JP | 2003-123325 | A | 4/2003 |
| JP | 2004-164726 | A | 6/2004 |
| JP | 2004-185779 | A | 7/2004 |
| JP | 2004-288264 | A | 10/2004 |

OTHER PUBLICATIONS

Supplementary European Search Report, EP 05 80 9293.

* cited by examiner

*Primary Examiner*—Joseph H Feild
*Assistant Examiner*—Tawfik Goma
(74) *Attorney, Agent, or Firm*—Lerner, David, Littenberg, Krumholz & Mentlik, LLP

(57) ABSTRACT

An optical disc of a desired thickness is formed by adhering a stamper substrate 20 to an L0 layer substrate 10. Concave/convex portions to transfer fine concave/convex portions for an L1 layer are formed on one principal plane of the stamper substrate 20. After the fine concave/convex portions for the L1 layer were transferred and formed onto an intermediate layer 32 by the stamper substrate 20, the stamper substrate 20 is adhered to the L0 layer substrate 10.

30 Claims, 10 Drawing Sheets

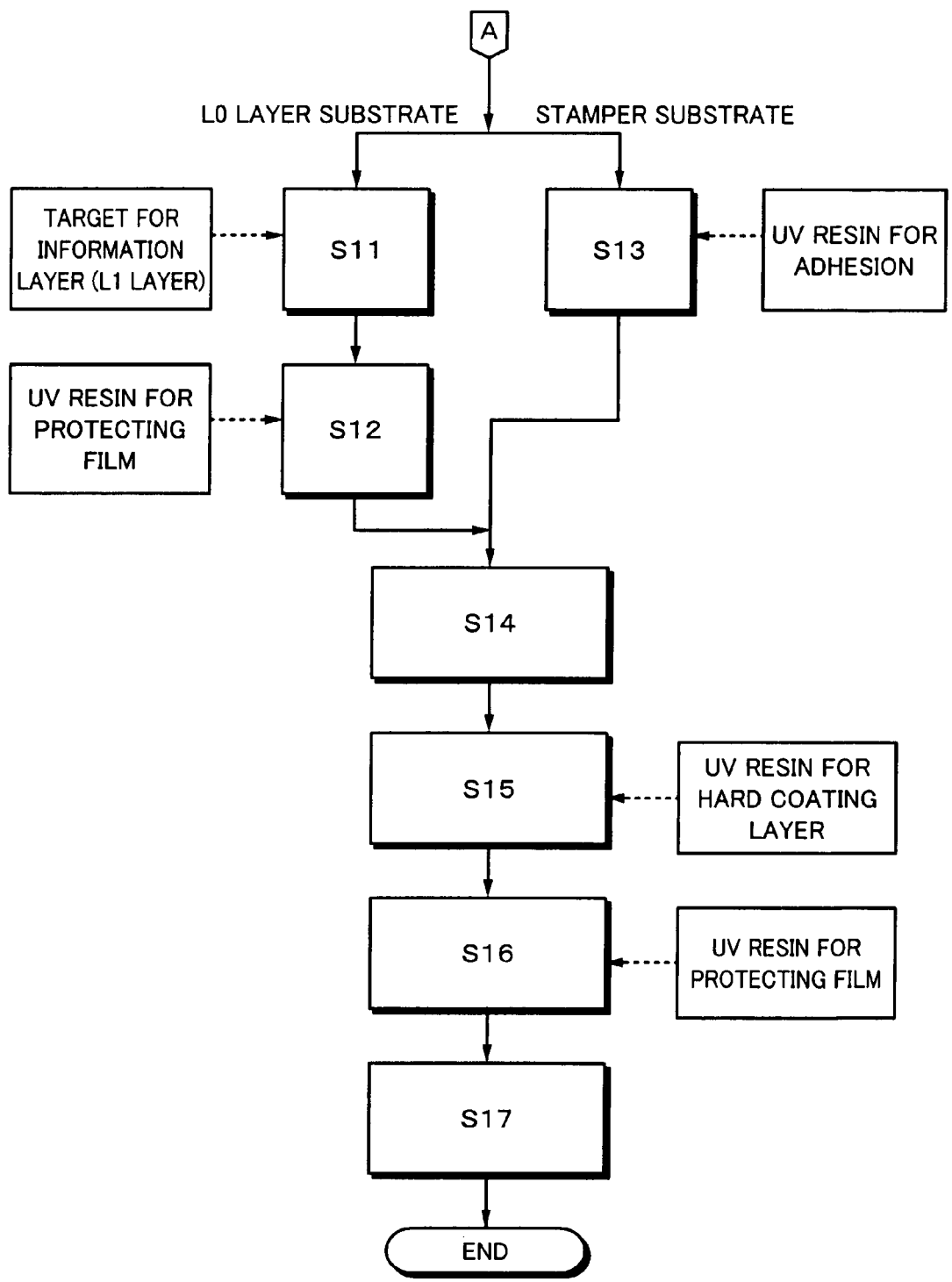

MANUFACTURING METHOD OF OPTICAL DISC AND OPTICAL DISC

TECHNICAL FIELD

The invention relates to a manufacturing method of an optical disc and the optical disc.

BACKGROUND ART

In recent years, a high-density optical disc such as a Blu-ray Disc (registered trademark) has been proposed. In the high-density optical disc, although it has the same shape as that of a DVD (Digital Versatile Disc), it can have a recording capacity of about 25 Gigabytes for a one-side single layer and about 50 Gigabytes for one-side double layers.

In the high-density optical disc, by setting a wavelength of a light source to 405 nm and setting a numerical aperture NA of an objective lens to a large value of 0.85, a diameter of a beam spot for recording and reproducing is reduced to 0.58 μm, thereby enabling a spot area which is equal to about ⅕ of that of the DVD to be obtained.

By increasing the numerical aperture NA of the objective lens as mentioned above, an angle error (referred to as a tilt margin) which is permitted in an inclination from 90° as an angle defined by a disc surface and an optical axis of a laser beam decreases.

In the high-density optical disc of the one-side single layer, therefore, a cover layer which covers an information layer is thinned to a thickness of 0.1 mm. In the case of the high-density optical disc of the one-side double layers, an information layer serving as a reference layer (the 0th recording layer) is formed at a position of a depth of 0.1 mm (100 μm) when seen from the incident direction of the laser beam and an information layer serving as an additional layer (the first recording layer) is formed at a position of a depth of 75 μm. The information layer denotes both of a reflecting layer in a read only optical disc and a recording layer in a writable optical disc. Hereinbelow, the 0th recording layer is properly referred to as an L0 layer and the first recording layer is properly referred to as an L1 layer.

To realize the further larger capacity as mentioned above, the optical disc of a multilayer structure having a plurality of information layers is considered to be promising.

Hitherto, as a manufacturing method of the read only high-density optical disc of the one-side double-layer structure, the following method has been known. When a substrate is molded, pits of the L1 layer are transferred by using a resin stamper for transfer having light transmitting performance constructed in such a manner that pits of the L0 layer have been formed onto one principal plane, an intermediate layer made by an ultraviolet (UV) hardening type resin has been formed onto one principal plane of a substrate formed with the pits of the L0 layer, and concave/convex portions to form the pits of the L1 layer have been formed on the surface of the intermediate layer. The ultraviolet rays are irradiated through the resin stamper. The UV hardening type resin is hardened. Thereafter, the resin stamper is peeled off and the pits of the L1 layer are formed.

For example, a technique in which the reasonable and light-weighted resin stamper can be obtained by using polycarbonate as a material of the resin stamper has been disclosed in JP-A-2002-260307.

However, the manufacturing method of the optical disc as mentioned above has the following problems. The resin stamper made of polycarbonate has such a problem that peel-off performance for the intermediate layer is not so good. Although a cycloolefin system resin material whose peel-off performance for the intermediate layer is good can be used as a material of the stamper, there are such problems that it is expensive, if it is used a plurality of times, its stickness is enhanced, the peel-off performance deteriorates, and the like. Further, according to the resin stamper, since the resin material deteriorates or is deformed by the irradiation of the ultraviolet rays, or the like, it is difficult to use it for the transfer of plural times. Therefore, ordinarily, the resin stamper is thrown away every transfer. There are, consequently, such problems that the material is wastefully consumed and the disposing process is burdened.

In the high-density optical disc as mentioned above, for example, it is necessary to set a thickness of substrate to about 1.1 mm. In the case where such a thick substrate is molded by injection molding, there are such problems that it takes a time to cool the substrate after the molding and a manufacturing cycle time of the optical disc is long.

In the optical disc in which the protecting layer having a thickness of about 0.1 mm or the like is formed on the substrate having a thickness of 1.1 mm and the thickness structure is unbalanced, for example, like a high-density optical disc as mentioned above, there is such a problem that a change such as a warp or the like is liable to occur in the disc due to moisture absorption or the like.

It is, therefore, an object of the invention to provide a manufacturing method of an optical disc whereby good information layers can be efficiently and reasonably formed without wastefully using a resin stamper and, further, a shape change such as a warp or the like can be suppressed and to provide the optical disc manufactured by the manufacturing method.

DISCLOSURE OF INVENTION

To solve the foregoing problems, according to the invention, there is provided a manufacturing method of an optical disc for recording and/or reproducing an information signal by irradiating recording and/or reproducing light onto one principal plane of a substrate, comprising the steps of:

molding the substrate in which concave/convex portions for an information layer have been formed on one principal plane by a stamper substrate;

forming the information layer onto the concave/convex portions;

forming a protecting layer having light transmitting performance onto the information layer; and adhering the stamper substrate or a stamper substrate used to form the concave/convex portions to another substrate onto the other principal plane of the substrate.

According to the invention, there is provided a manufacturing method of an optical disc for recording and/or reproducing an information signal by irradiating recording and/or reproducing light onto one principal plane of a substrate, comprising the steps of:

molding the substrate in which concave/convex portions for a first information layer have been formed on one principal plane;

forming the first information layer onto the concave/convex portions;

coating each of the first information layer and a principal plane on which concave/convex portions of a stamper substrate have been formed with a resin material;

forming an intermediate layer in which concave/convex portions for a second information layer have been formed onto the first information layer by semi-hardening at least one of the resin materials with which the first information layer and the stamper substrate have respectively been coated, adhering those resin materials, hardening the adhered resin materials, and subsequently peeling off the stamper substrate;

forming the second information layer onto the intermediate layer;

forming a protecting layer having light transmitting performance onto the second information layer; and adhering the stamper substrate or a stamper substrate used to form the concave/convex portions for the second information layer to another substrate onto the other principal plane of the substrate.

According to the invention, there is provided a manufacturing method of an optical disc for recording and/or reproducing an information signal by irradiating recording and/or reproducing light onto one principal plane of a substrate, comprising the steps of:

molding the substrate in which concave/convex portions for a first information layer have been formed on one principal plane;

forming the first information layer onto the concave/convex portions;

forming an intermediate layer in which concave/convex portions for a second information layer have been formed on the first information layer by coating the first information layer with a resin material having light transmitting performance, transferring concave/convex portions of a stamper substrate onto the coated resin material, and subsequently hardening the resin material;

forming the second information layer onto the intermediate layer;

forming a protecting layer having the light transmitting performance onto the second information layer; and adhering the stamper substrate or a stamper substrate used to form the concave/convex portions for the second information layer to another substrate onto the other principal plane of the substrate.

According to the invention, there is provided an optical disc for recording and/or reproducing an information signal by irradiating recording and/or reproducing light onto one principal plane of a substrate, comprising:

the substrate in which concave/convex portions for an information layer have been formed on one principal plane by a stamper substrate;

the information layer formed on the concave/convex portions;

a protecting layer having light transmitting performance formed on the information layer; and the stamper substrate or a stamper substrate used to form the concave/convex portions to another substrate which has been adhered to the other principal plane of the substrate.

According to the invention, there is provided an optical disc for recording and/or reproducing an information signal by irradiating recording and/or reproducing light onto one principal plane of a substrate, comprising:

the substrate in which concave/convex portions for a first information layer have been formed on one principal plane;

the first information layer formed on the concave/convex portions;

an intermediate layer in which concave/convex portions for a second information layer have been formed on the first information layer by coating each of the first information layer and a principal plane of a stamper substrate on which concave/convex portions have been formed with a resin material, semi-hardening at least one of the resin materials with which the first information layer and the stamper substrate have been coated, adhering those resin materials, hardening the adhered resin materials, and subsequently peeling off the stamper substrate;

the second information layer formed on the intermediate layer;

a protecting layer having light transmitting performance formed on the second information layer; and the stamper substrate or a stamper substrate used to form the concave/convex portions for the second information layer to another substrate which has been adhered onto the other principal plane of the substrate.

According to the invention, there is provided an optical disc for recording and/or reproducing an information signal by irradiating recording and/or reproducing light onto one principal plane of a substrate, comprising:

the substrate in which concave/convex portions for a first information layer have been formed on one principal plane;

the first information layer formed on the concave/convex portions;

an intermediate layer in which concave/convex portions for a second information layer have been formed onto the first information layer by coating the first information layer with a resin material having light transmitting performance, transferring concave/convex portions of a stamper substrate onto the coated resin material, and subsequently hardening the resin material;

the second information layer formed on the intermediate layer;

a protecting layer having the light transmitting performance formed on the second information layer; and the stamper substrate or a stamper substrate used to form the concave/convex portions for the second information layer to another substrate which has been adhered onto the other principal plane of the substrate.

According to the invention, by adhering the substrate and the stamper substrate, it is unnecessary to dispose of the stamper substrate and the costs such as material costs, disposal expenses, and the like can be reduced. Since the number of transfer which is executed by the stamper substrate can be set to only once, the good concave/convex portions without a shape deterioration or the like that is caused by the transfer of a plurality of times can be transferred.

By adhering the substrate and the stamper substrate so as to have a desired thickness, the shape change such as a warp or the like can be prevented. The thickness of substrate to be formed can be thinned and the manufacturing cycle time can be shortened. For example, in the case of manufacturing the high-density optical disc having the same shape as that of the DVD, a die for molding the disc substrate for the DVD and a DVD manufacturing apparatus can be also used or used in common.

BRIEF DESCRIPTION OF DRAWINGS

FIG. 2 is a flowchart (latter half) showing the example of the manufacturing steps of the optical disc to which the embodiment of the invention is applied.

BEST MODE FOR CARRYING OUT THE INVENTION

Figure 1:
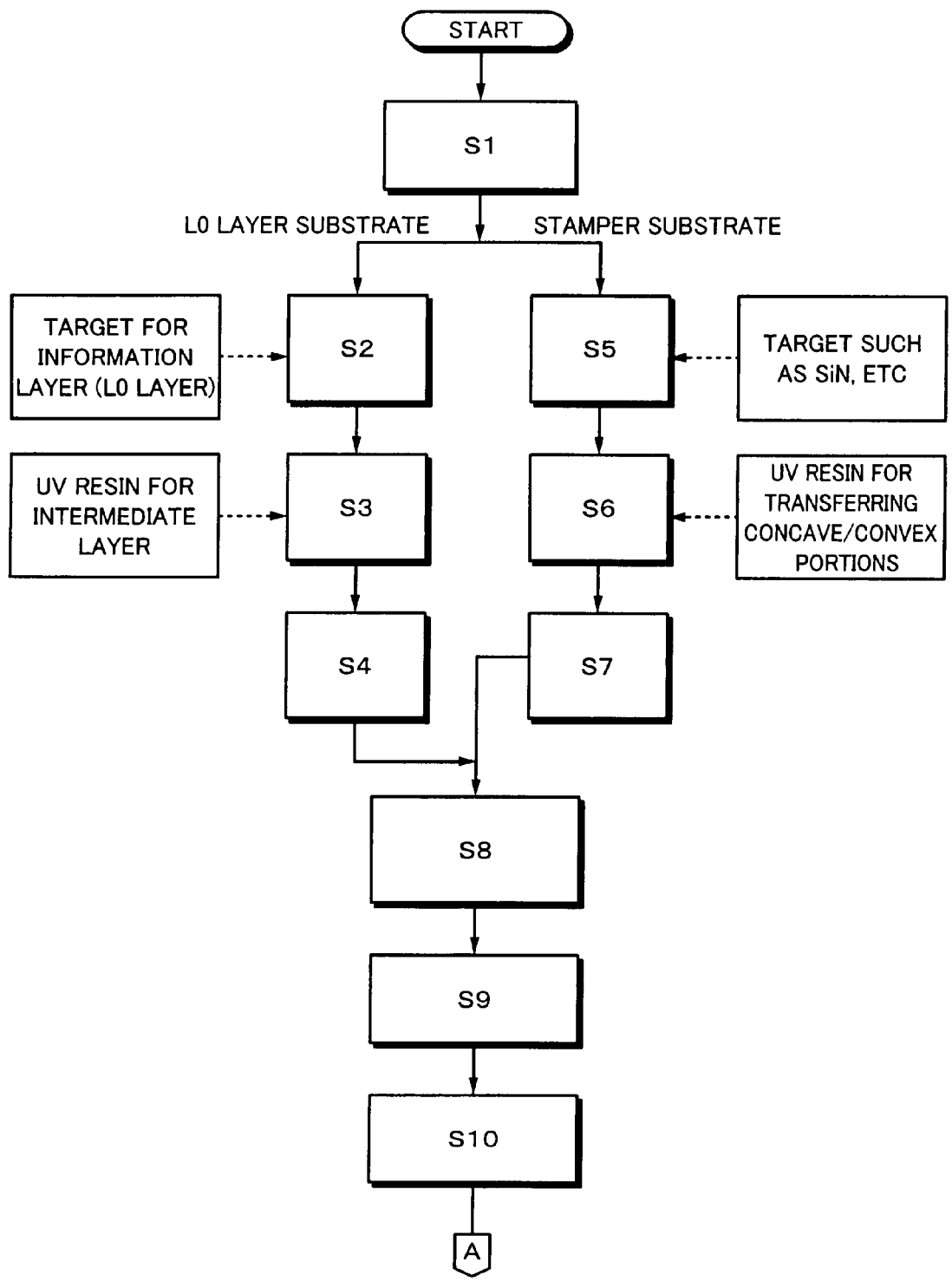
FIG. 1 is a flowchart (former half) showing an example of manufacturing steps of an optical disc to which an embodiment of the invention is applied.

An embodiment of the invention will be described hereinbelow with reference to the drawings. As for an optical disc according to the embodiment of the invention, an L0 layer substrate in which an L0 layer is formed on one principal plane and a stamper substrate which is used as a stamper are adhered, thereby constructing an optical disc substrate. FIGS. 1 and 2 are flowcharts showing an example of manufacturing steps of the optical disc of the one-side double-layer structure to which the embodiment is applied. FIGS. 3 to 8 enlargedly show a cross section of the disc in each step in the manufacturing steps. A symbol "A" shown in FIG. 1 denotes that it continues to a symbol "A" shown in FIG. 2.

Figure 3A:
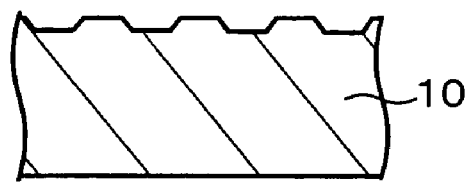
FIGS. 3A to 3D are cross sectional enlarged diagrams of the disc for explaining molding steps of an L0 layer substrate.
Figure 4A:
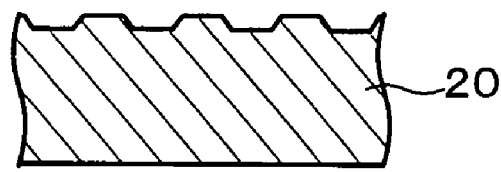
FIGS. 4A to 4D are cross sectional enlarged diagrams of the disc for explaining molding steps of a stamper substrate.

An L0 layer substrate 10 shown in FIG. 3A and a stamper substrate 20 shown in FIG. 4A are molded by, for example, injection molding (step S1). The L0 layer substrate 10 is a disc substrate made of a synthetic resin material or the like and has fine concave/convex portions for the L0 layer. In the embodiment, an information layer denotes both of a reflecting layer in a read only optical disc and a recording layer in a writable optical disc. The fine concave/convex portions for the L0 layer correspond to pits or lands/grooves or the like of the L0 layer.

The stamper substrate 20 is a substrate having light transmitting performance and made of a resin material or the like and concave/convex portions for transferring fine concave/convex portions for an L1 layer have been formed on one principal plane. The fine concave/convex portions for the L1 layer correspond to pits or lands/grooves or the like of the L1 layer. The stamper substrate 20 has the principal plane having the same diameter as that of the L0 layer substrate 10 and is used as a stamper. A center hole (not shown) is formed in each of the L0 layer substrate 10 and the stamper substrate 20.

The fine concave/convex portions formed on one principal plane of each of the L0 layer substrate 10 and the stamper substrate 20 have been formed by, for example, transferring the concave/convex portions of the stamper made of nickel or the like arranged in a cavity upon injection molding. That is, the L0 layer substrate 10 and the stamper substrate 20 are molded by a method whereby, for example, the stamper made of a metal such as nickel or the like molded by a well-known method is attached to a mold of an injection molding machine and a resin material fused by heat is injected and filled into a cavity formed by the die, thereby allowing the concave/convex portions of the stamper made of the metal to be transferred.

Although the L0 layer substrate 10 and the stamper substrate 20 can be molded separately by two molding machines, it is preferable to simultaneously mold them by an injection molding machine of what are called two cavities which can simultaneously mold the two substrates and which is used for manufacturing, for example, the DVD or the like. By this method, the L0 layer substrate 10 and the stamper substrate 20 can be efficiently molded.

As a material of the stamper substrate 20, a reasonable material in which high transfer performance is obtained and deformation is small is preferable. For example, as a material of the stamper substrate 20, by using the same material as that of the L0 layer substrate 10, the stamper substrate 20 can be molded in a manner similar to that upon manufacturing of the optical disc substrate. Specifically speaking, as a material of the L0 layer substrate 10 and the stamper substrate 20, polycarbonate which is widely used as a material of the optical disc substrate is used when it is molded by the injection molding.

It is preferable to almost equalize thicknesses of the L0 layer substrate 10 and the stamper substrate 20. The thicknesses of the L0 layer substrate 10 and the stamper substrate 20 are selected so that the optical disc of a desired thickness is formed when the L0 layer substrate 10 and the stamper substrate 20 are adhered. As mentioned above, by equalizing the molding conditions such as materials, thicknesses, molding timing, and the like of the L0 layer substrate 10 and the stamper substrate 20 and adhering the L0 layer substrate 10 and the stamper substrate 20 so that the directions of their warps are opposite, a warp of the disc can be suppressed.

As mentioned above, in the embodiment, the optical disc substrate which is inherently formed by one disc is constructed by adhering the two disc substrates such as L0 layer substrate 10 and stamper substrate 20. Therefore, for example, if the invention is applied to the manufacturing of the high-density optical disc of the same shape as that of the DVD, by properly setting a thickness of disc substrate which is molded, the die and the molding machine for the DVD which are used to adhere the two disc substrates can be used in common. Since the thickness of disc substrate which is molded can be thinned, a cooling time of the disc substrate can be fairly shortened.

Each of the molded L0 layer substrate 10 and the stamper substrate 20 is conveyed to a film forming apparatus for executing a film forming process in the next step. If the L0 layer substrate 10 and the stamper substrate 20 are molded by the injection molding machine, the L0 layer substrate 10 and the stamper substrate 20 are cooled to a desired temperature and conveyed.

Figure 3B:
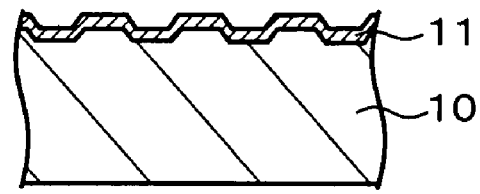

The following processes are executed to the L0 layer substrate 10 conveyed to the film forming apparatus. First, as shown in FIG. 3B, an information layer (L0 layer) 11 is formed by sputtering or the like onto one principal plane of the L0 layer substrate 10 on which the concave/convex portions have been formed (step S2). For example, in the case of a read only optical disc, a total reflecting film is formed by a film material such as Ag (silver), Ag system alloy, or the like. In the case of a writable optical disc, a recording layer is formed. The recording layer is formed by, for example, sequentially forming a reflecting film made of Ag, Ag alloy, or the like, a protecting film made of ZnS—SiO$_2$ or the like, a recording layer of a Ge—Sb—Te system, and a protecting film made of ZnS—SiO$_2$ or the like and laminating them.

Figure 3C:
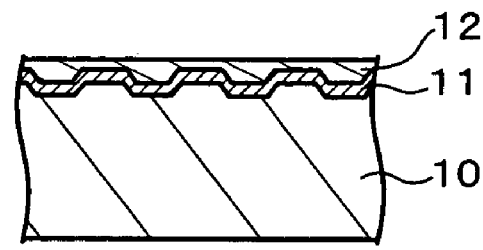

After the information layer (L0 layer) 11 was formed on the one principal plane of the L0 layer substrate 10, the L0 layer substrate 10 is conveyed to an adhesive agent coating apparatus and, as shown in FIG. 3C, the one principal plane of the L0 layer substrate 10 on which the information layer (L0 layer) 11 has been formed is coated with an ultraviolet hardening type resin (UV resin) 12 having light transmitting performance adapted to form an intermediate layer (step S3). The one principal plane of the L0 layer substrate 10 is coated with an ultraviolet hardening type resin 12 by, for example, a spin coating method so as to have a uniform thickness. As an ultraviolet hardening type resin 12 which is coated here, for example, a resin whose viscosity is slightly high to be equal to about 500 to 3000 mPs is used in order to uniform the film thickness after the coating. In the case of the high-density optical disc of the one-side double-layer structure in which a thickness of intermediate layer is equal to 25 μm, for example, the one principal plane is coated with the ultraviolet hardening type resin 12 so as to have the thickness of 20 to 22 μm.

Figure 3D:
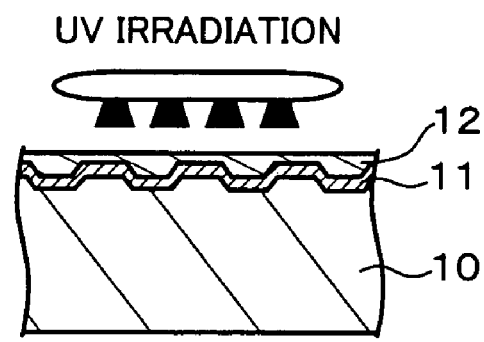

After the one principal plane of the L0 layer substrate 10 was coated with the ultraviolet hardening type resin 12, as shown in FIG. 3D, ultraviolet rays are irradiated to the ultraviolet hardening type resin 12, thereby hardening the ultraviolet hardening type resin 12 for the intermediate layer (step S4). At this time, in order to enhance an adhesive power with the stamper substrate 20 which is adhered in a post step, irradiating intensity of the ultraviolet rays is adjusted so that the ultraviolet hardening type resin 12 is not completely hardened but becomes a semi-hardening state.

Figure 4B:
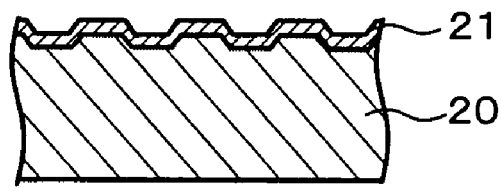

The following processes are executed to the stamper substrate 20 conveyed to the film forming apparatus. First, as shown in FIG. 4B, a peel-off/moisture-proof film 21 is formed by sputtering or the like onto one principal plane of the stamper substrate 20 on which the concave/convex portions have been formed (step S5). As a peel-off/moisture-proof film 21, for example, a metal film having semi-transmitting performance such as SiN (silicon nitride), Ag, Ag system alloy, or the like in which peel-off performance for an ultraviolet hardening type resin 22 is high and moisture proof performance is high is used. The peel-off/moisture-proof film 21 can be efficiently formed by using the same material as the material which is used for the information layer (L0 layer) 11 or, for example, an information layer (L1 layer) 13, which will be explained hereinafter.

Figure 4C:
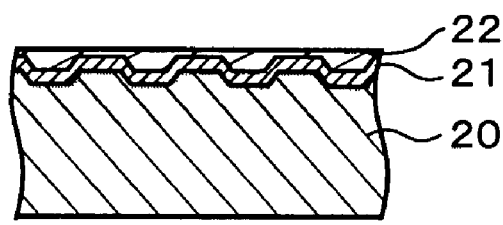

After the peel-off/moisture-proof film 21 was formed on the one principal plane of the stamper substrate 20, the stamper substrate 20 is conveyed to the adhesive agent coating apparatus and, as shown in FIG. 4C, the one principal plane of the stamper substrate 20 on which the peel-off/moisture-proof film 21 has been formed is coated with the ultraviolet hardening type resin 22 having the light transmitting performance for transferring the concave/convex portions (step S6).

As an ultraviolet hardening type resin 22, it is preferable to use a resin material such as polycarbonate or the like and a material in which an adhesive power with the peel-off/moisture-proof film 21 is low and transfer performance is high. The one principal plane of the stamper substrate 20 is coated with the ultraviolet hardening type resin 22 by, for example, the spin coating method so as to have a uniform thickness. By coating by using the spin coating method, the concave/convex portions of the stamper substrate 20 are coated with the ultraviolet hardening type resin 22 without gaps and the concave/convex portions can be preferably transferred. As an ultraviolet hardening type resin 22 to be coated here, in order to thin the film thickness after the coating, a resin whose viscosity is relatively low to be equal to, for example, about 50 to 300 mPs is used. Thus, a variation of the film thickness can be suppressed to a small value. In the case of the high-density optical disc of the one-side double-layer structure in which the thickness of intermediate layer is equal to 25 μm, for example, the one principal plane is coated with the ultraviolet hardening type resin 22 so as to have the thickness of 3 to 5 μm. By thinning the thickness of ultraviolet hardening type resin 22 in this manner, for example, even if a material which is more expensive than the ultraviolet hardening type resin 12 is used as an ultraviolet hardening type resin 22, an increase in costs can be suppressed.

Figure 4D:
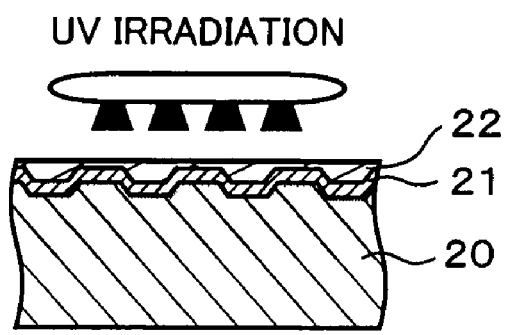

After the one principal plane of the stamper substrate 20 was coated with the ultraviolet hardening type resin 22, as shown in FIG. 4D, the ultraviolet rays are irradiated to the ultraviolet hardening type resin 22, thereby hardening the ultraviolet hardening type resin 22 for transferring the concave/convex portions (step S7). At this time, in order to enhance the adhesive power with the L0 layer substrate 10 which is adhered in a post step, the irradiating intensity of the ultraviolet rays is adjusted so that the ultraviolet hardening type resin 22 is not completely hardened but becomes a semi-hardening state. Although both of the ultraviolet hardening type resin 12 and the ultraviolet hardening type resin 22 before the adhesion are semi-hardened in the embodiment, only either the ultraviolet hardening type resin 12 or the ultraviolet hardening type resin 22 can be semi-hardened or either the ultraviolet hardening type resin 12 or the ultraviolet hardening type resin 22 can be also semi-hardened and the other can be also hardened.

The processes which are executed to the L0 layer substrate 10 and the stamper substrate 20 can be executed in parallel by using, for example, the ordinary manufacturing apparatus of the optical disc for adhesion such as a DVD or the like. Thus, a cycle time can be shortened.

Figure 5A:
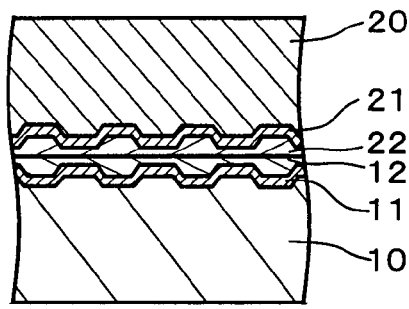
FIGS. 5A to 5C are cross sectional enlarged diagrams of the disc for explaining adhering and peeling-off steps.

Subsequently, as shown in FIG. 5A, the one principal plane of the L0 layer substrate 10 coated with the ultraviolet hardening type resin 12 and the one principal plane of the stamper substrate 20 coated with the ultraviolet hardening type resin 22 are overlaid and the L0 layer substrate 10 and the stamper substrate 20 are adhered (step S8).

Figure 5B:
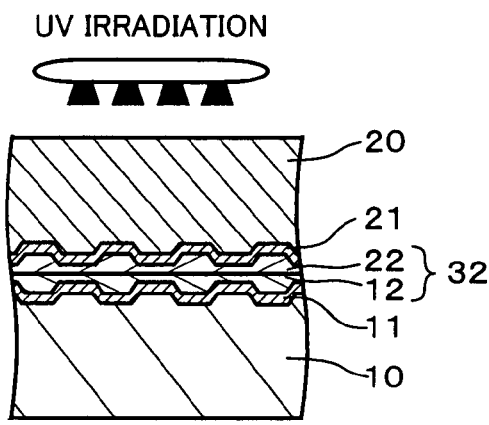

After the L0 layer substrate 10 and the stamper substrate 20 were adhered, as shown in FIG. 5B, the ultraviolet rays are irradiated from the stamper substrate 20 side to an intermediate layer 32 constructed by the ultraviolet hardening type resin 12 and the ultraviolet hardening type resin 22 formed by the adhesion, thereby completely hardening the intermediate layer 32 (step S9).

Figure 5C:
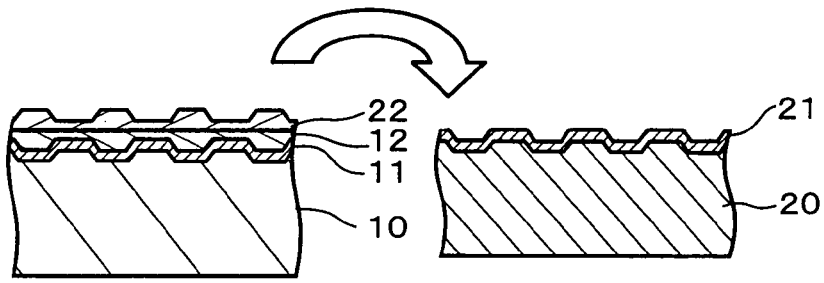

After the intermediate layer 32 was completely hardened, the stamper substrate 20 is peeled off from the adhered disc substrate (step S10). For example, both surfaces of the adhered disc substrate are adsorbed and held by a vacuum adsorption pad, a wedge-shaped metal fitting is inserted between the L0 layer substrate 10 and the stamper substrate 20 from the center hole side, and the compressed air is supplied into a gap formed by the insertion, thereby peeling off the stamper substrate 20. At this time, since the adhesive power between the peel-off/moisture-proof film 21 and the ultraviolet hardening type resin 22 formed on the one principal plane of the stamper substrate 20 is small, as shown in FIG. 5C, the ultraviolet hardening type resin 22 with which the one principal plane of the stamper substrate 20 has been coated is peeled off from the stamper substrate 20. The concave/convex portions of the stamper substrate 20 are transferred onto the one principal plane of the L0 layer substrate 10. The layer of the ultraviolet hardening type resin 22 on which the fine concave/convex portions for the information layer (L1 layer) have been formed is formed.

Figure 6A:
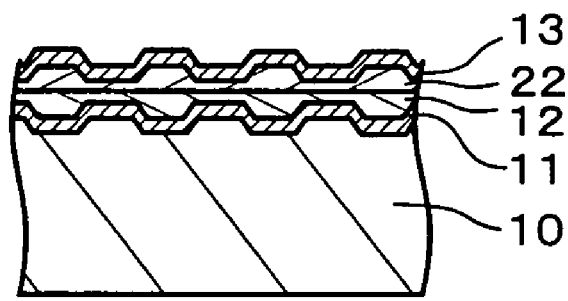
FIGS. 6A and 6B are cross sectional enlarged diagrams of the disc for explaining steps of the stamper substrate side.

After the stamper substrate 20 was peeled off, as shown in FIG. 6A, the information layer (L1 layer) 13 is formed by sputtering or the like onto the one principal plane of the L0 layer substrate 10 on which the fine concave/convex portions for the information layer (L1 layer) have been formed by the ultraviolet hardening type resin 22 (step S11). For example, in the case of the read only optical disc, a semi-transmitting film is formed by a film material such as Ag (silver), Ag system alloy, or the like. In the case of the writable optical disc, a recording layer is formed. The recording layer is formed by, for example, sequentially forming a reflecting film made of Ag, Ag alloy, or the like, a protecting film made of ZnS—SiO$_2$ or the like, a recording layer of a Ge—Sb—Te system, and a protecting film made of ZnS—SiO$_2$ or the like and laminating them.

Figure 6B:
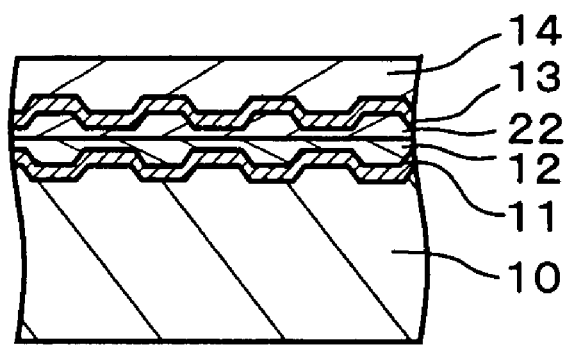

After the information layer (L1 layer) 13 was formed on the one principal plane of the L0 layer substrate 10, as shown in FIG. 6B, the one principal plane of the L0 layer substrate 10 on which the information layer (L1 layer) 13 has been formed is coated with an ultraviolet hardening type resin having light transmitting performance for a cover layer, thereby forming a protecting layer (cover layer) 14 (step S12). In this instance, the surface of the information layer (L1 layer) 13 is coated with the ultraviolet hardening type resin by, for example, a spin coating method so as to have a uniform thickness.

Figure 7:
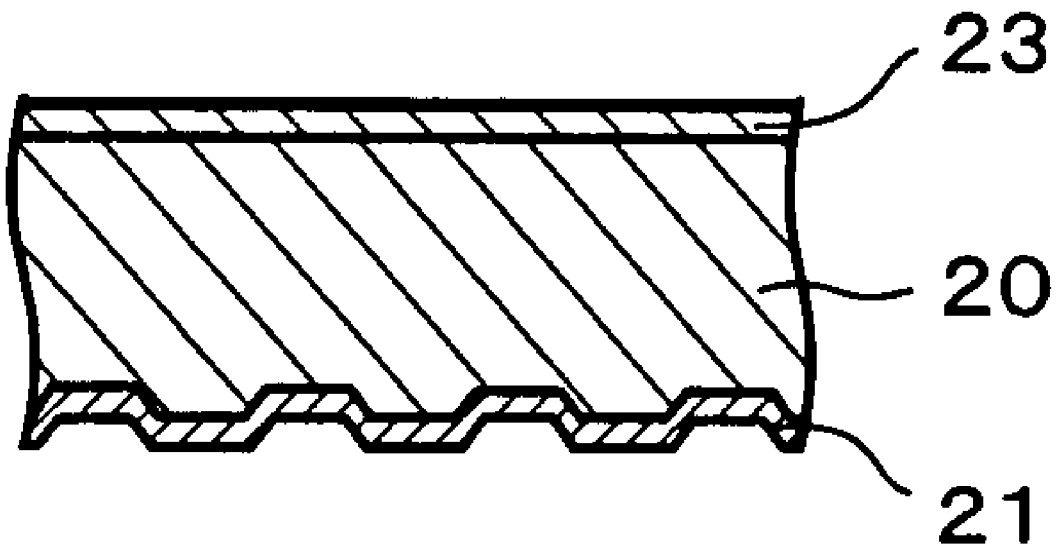
FIG. 7 is a cross sectional enlarged diagram of the disc for explaining steps of the stamper substrate side.

For the stamper substrate 20 after the peel-off, as shown in FIG. 7, the other principal plane on which no concave/convex portions are formed is coated with an adhesive agent 23 for adhesion so as to have a uniform thickness (step S13). As an adhesive agent 23 for adhesion, in order to assure uniformity of the thickness of optical disc, for example, it is preferable to use an ultraviolet hardening type resin which is also used in other steps. The other principal plane of the stamper substrate 20 is coated with the ultraviolet hardening type resin by, for example, the spin coating method so as to have a uniform thickness. The other principal plane is coated with the adhesive agent 23 so as to have a thickness of, for example, about a few μm.

By executing the processes for the L0 layer substrate 10 and the stamper substrate 20 in parallel, the cycle of the manufacturing apparatus can be shortened.

Figure 8A:
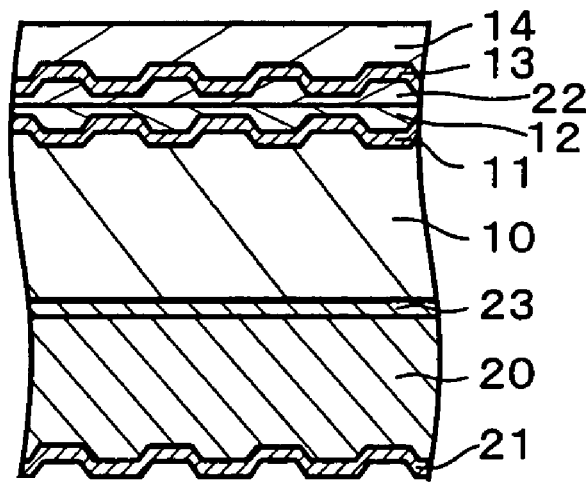
FIGS. 8A to 8D are cross sectional enlarged diagrams of the disc for explaining steps after the adhesion.

Subsequently, as shown in FIG. 8A, the other principal plane of the L0 layer substrate 10 and the other principal plane of the stamper substrate 20 are adhered and the adhesive agent 23 is hardened (step S14). For example, if the adhesive agent 23 is the ultraviolet hardening type resin, by irradiating the ultraviolet rays from the stamper substrate 20 side, the adhesive agent 23 is hardened. Thus, the optical disc substrate by the adhesion is formed. The process to form the protecting layer 14 in step S12 mentioned above can be also executed after the L0 layer substrate 10 and the stamper substrate 20 were adhered.

Figure 8B:
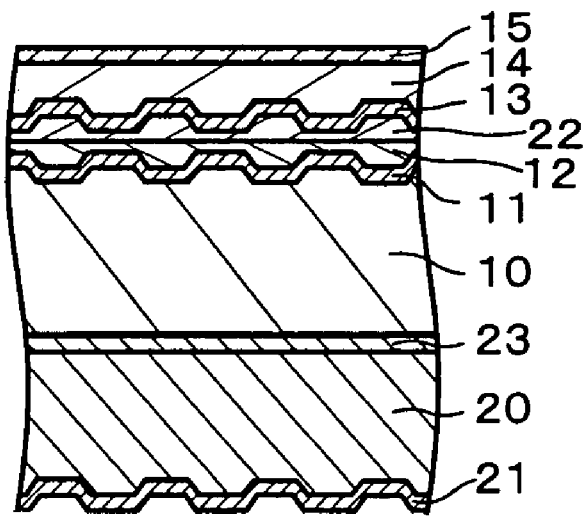

After the L0 layer substrate 10 and the stamper substrate 20 were adhered, as shown in FIG. 8B, the one principal plane of the L0 layer substrate 10 on which the protecting layer 14 has been formed, that is, the surface of the protecting layer 14 is coated with a known hard coating agent having light transmitting performance, thereby forming a hard coating layer 15 (step S15). A thickness of hard coating layer 15 is set to, for example, about a few μm. The surface side on which the hard coating layer 15 has been formed becomes a reading surface or a writing surface of the optical disc. The hard coating layer 15 is provided to protect the protecting layer 14 serving as a reading surface or a writing surface and is formed on the protecting layer 14 as necessary.

Figure 8C:
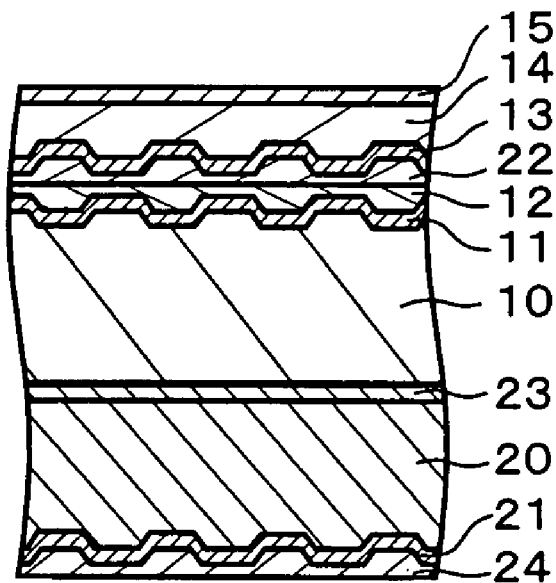

After the hard coating layer 15 was formed on the one principal plane of the L0 layer substrate 10, as shown in FIG. 8C, the one principal plane of the stamper substrate 20, that is, the concave/convex portions forming surface on which the peel-off /moisture-proof film 21 has been formed is coated with an ultraviolet hardening type resin for the protecting film. The ultraviolet rays are irradiated to the coated ultraviolet hardening type resin, thereby hardening the ultraviolet hardening type resin and forming a protecting layer 24 (step S16). In this instance, the surface coated with the ultraviolet hardening type resin by, for example, the spin coating method so as to have a uniform thickness. The thickness of protecting layer 24 is set to, for example, about a few μm. The surface side on which the protecting layer 24 has been formed becomes a print surface of the optical disc. By providing the protecting layer 24, oxidation of the peel-off/moisture-proof film 21 can be prevented. An adhesion power of ink in a label print 25 in the next step can be increased.

After the protecting layer 24 was formed on the one principal plane of the stamper substrate 20, the adhered disc is conveyed to an apparatus for executing inspecting and label printing steps.

Figure 8D:
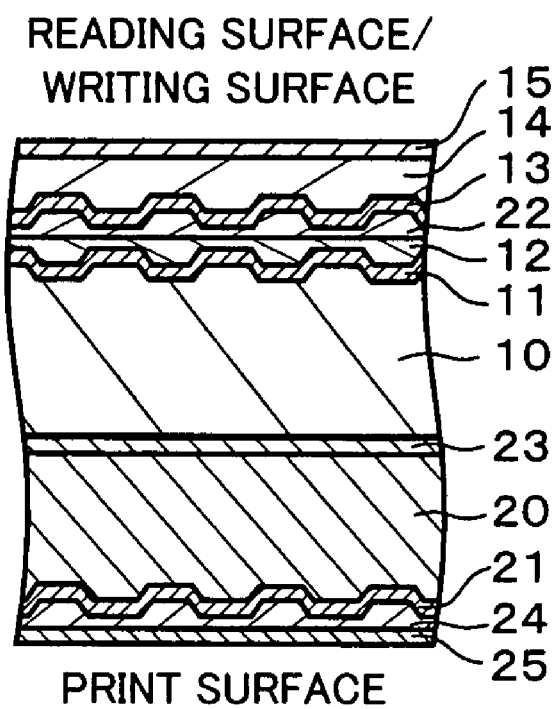

In the label printing step, as shown in FIG. 8D, the label print 25 is executed to the one principal plane of the stamper substrate 20 on which the protecting layer 24 has been formed (step S17). The forming steps of the protecting layer 14, hard coating layer 15, protecting layer 24, and label print 25 are not limited to, particularly, the foregoing step order. For example, after the protecting layer 24 was formed, the protecting layer 14 and the hard coating layer 15 can be formed. In this manner, the optical disc of the one-side double-layer structure is manufactured.

Figure 9:
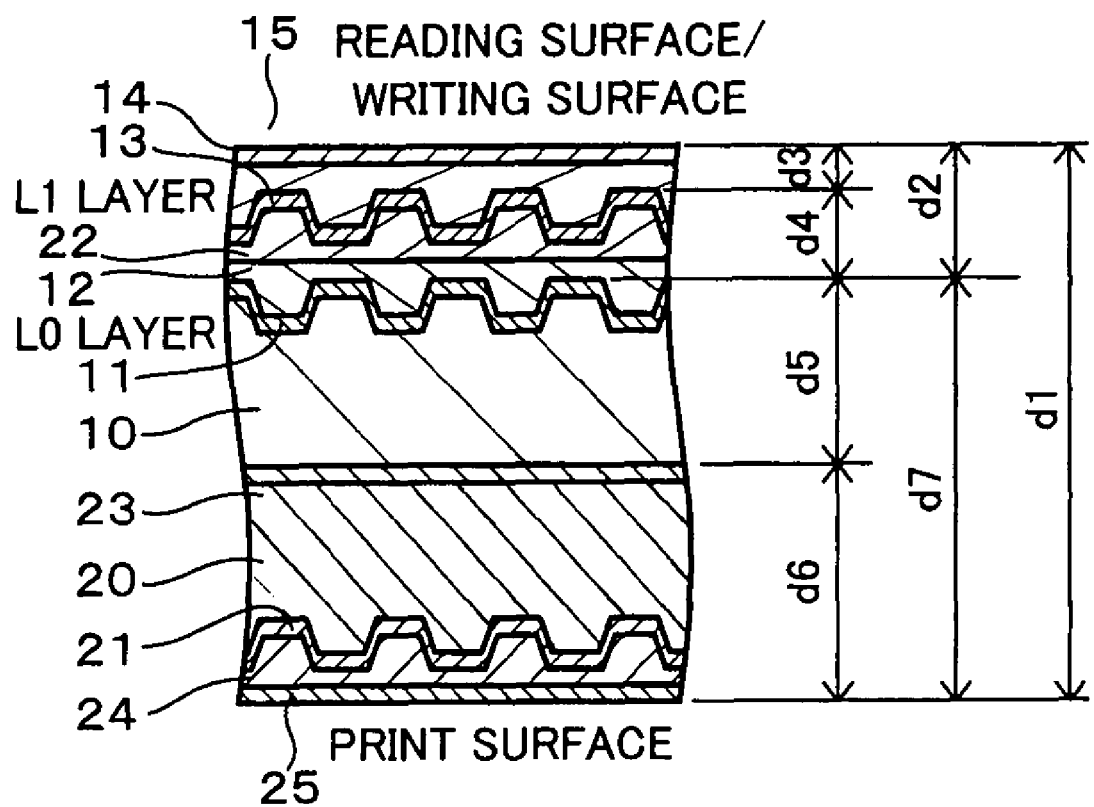
FIG. 9 is a schematic diagram showing an example of a cross sectional construction of a high-density optical disc of a one-side double-layer structure to which the embodiment is applied.

FIG. 9 shows an example of a cross sectional construction of the high-density optical disc manufactured as mentioned above. A thickness d1 of the whole disc from the reading surface/writing surface to the print surface is equal to 1.2 mm. A thickness d2 from the L0 layer to the reading surface/writing surface is equal to 100 μm. A thickness d3 from the L1 layer to the reading surface/writing surface is equal to 75 μm. That is, a thickness d4 of the intermediate layer 32 is equal to 25 μm. Thicknesses d5 and d6 of the L0 layer substrate 10 and the stamper substrate 20 are equal to about 0.55 mm. A thickness d7 from the print surface of the optical disc substrate obtained by adhering the L0 layer substrate 10 and the stamper substrate 20 to the L0 layer is equal to 1.1 mm. A thickness of the optical disc substrate is equal to the thickness including the information layer (L0 layer) 11, peel-off/moisture-proof film 21, adhesive agent 23, protecting layer 24, label print 25, and the like.

As for the optical disc, by irradiating a laser beam from the reading surface/writing surface side to the L0 layer or the L1 layer in an in-focus state, data is read out or written from/into the L0 layer or the L1 layer.

As described above, according to the embodiment of the invention, the cycle time can be shortened. Since the new stamper substrate 20 is used every transfer, the concave/convex portions of the L1 layer can be preferably transferred. Since the stamper substrate 20 used for the transfer is adhered to the L0 layer substrate 10, the disposal of the stamper substrate 20 is unnecessary and the material costs and the disposal expenses can be reduced. Since the optical disc substrate is constructed by adhering the L0 layer substrate 10 and the stamper substrate 20, particularly, in the case where the L0 layer substrate 10 and the stamper substrate 20 are molded under the same conditions, by adhering them so that the warp directions become opposite, the deformation such as a warp or the like of the adhered L0 layer substrate 10 and stamper substrate 20 in association with the elapse of the time can be suppressed. Further, the deformation such as a warp or the like of the disc can be suppressed by the adhesive agent 23 between the L0 layer substrate 10 and the stamper substrate 20.

For example, in the case where the invention is applied to the manufacturing of the high-density optical disc having the same shape as that of the DVD, the existing DVD manufacturing equipment which adheres the disc substrates can be used. Thus, the disc can be manufactured with low costs without expending a long time.

The invention is not limited to the foregoing embodiment of the invention but various modifications and applications are possible within the scope without departing from the spirit of the invention. For example, although the stamper substrate 20 itself used for the transfer of the concave/convex portions for the L1 layer has been adhered to the L0 layer substrate 10 in the foregoing embodiment, as a stamper substrate 20 which is adhered, a stamper substrate used for the manufacturing of another optical disc may be used.

Although the intermediate layer 32 has been formed by adhering the ultraviolet hardening type resin 12 and the ultraviolet hardening type resin 22 in the above embodiment, the method of forming the intermediate layer is not limited to such a method. For example, the intermediate layer 32 can be formed by a method whereby the information layer (L0 layer) 11 is coated with the resin material having the light transmitting performance, the concave/convex portions of the stamper substrate 20 are transferred to the coated resin material, and thereafter, the resin material is hardened.

Although the optical disc of the one-side double-layer structure has been described in the foregoing embodiment, the structure of the optical disc is not limited to such a structure. For example, by transferring the concave/convex portions of the stamper substrate 20 and forming the concave/convex portions for the L0 layer onto the one principal plane of the L0 layer substrate 10, the invention can be also applied to the optical disc of a single layer structure. For example, only the L1 layer on the intermediate layer 32 is used as an information layer without forming the concave/convex portions for the information layer onto the one principal plane of the L0 layer substrate 10 and, further, without forming the information layer (L0 layer), thereby also enabling the optical disc of a single layer structure to be formed.

By forming two or more sets each constructed by the intermediate layer 32 and the information layer (L1 layer) 13 mentioned above, the invention can be applied to an optical disc having a structure of three or more layers. In this case, a plurality of stamper substrates 20 used for the transfer of the concave/convex portions of each layer are overlaid and adhered onto the L0 layer substrate 10 and an optical disc substrate is formed. A plurality of stamper substrates used for the manufacturing of another optical disc may be overlaid and adhered. Even in the optical disc of a structure of a single layer and the optical disc of a structure of two or more layers, a plurality of stamper substrates 20 can be overlaid and adhered.

A defective substrate, a dummy substrate, or the like other than the substrate used as a stamper can be also used as a stamper substrate 20. As for the foregoing ultraviolet hardening type resin, another material such as a thermoplastic resin or the like can be used so long as it has desired characteristics. The shapes of the L0 layer substrate 10 and the stamper substrate 20 are not limited to the disc shape having the center hole.

DESCRIPTION OF REFERENCE NUMERALS

10 L0 LAYER SUBSTRATE
11 INFORMATION LAYER (L0 LAYER)
12 ULTRAVIOLET HARDENING TYPE RESIN
13 INFORMATION LAYER (L1 LAYER)
14 PROTECTING LAYER
15 HARD COATING LAYER
20 STAMPER SUBSTRATE
21 PEEL-OFF/MOISTURE-PROOF FILM
22 ULTRAVIOLET HARDENING TYPE RESIN
23 ADHESIVE AGENT
24 PROTECTING LAYER
25 LABEL PRINT
32 INTERMEDIATE LAYER
S1 MOLD L0 LAYER AND STAMPER SUBSTRATE
S2 FORM INFORMATION LAYER (L0 LAYER)
S3 COAT UV RESIN FOR INTERMEDIATE LAYER
S4 HARDEN UV RESIN FOR INTERMEDIATE LAYER
S5 FORM PEEL-OFF/MOISTURE-PROOF FILM
S6 COAT UV RESIN FOR TRANSFERRING CONCAVE/CONVEX PORTIONS
S7 HARDEN UV RESIN FOR TRANSFERRING CONCAVE/CONVEX PORTIONS
S8 ADHERE L0 LAYER SUBSTRATE AND STAMPER SUBSTRATE
S9 HARDEN INTERMEDIATE LAYER UV
S10 PEEL OFF STAMPER SUBSTRATE
S11 FORM INFORMATION LAYER (L1 LAYER)
S12 FORM LIGHT TRANSMITTING PROTECTING LAYER
S13 COAT ADHESIVE LAYER FOR ADHERING
S14 ADHERE L0 LAYER SUBSTRATE AND STAMPER SUBSTRATE
S15 FORM HARD COATING LAYER (READING SURFACE SIDE)
S16 FORM PROTECTING LAYER (PRINT SURFACE SIDE)
S17 PRINT LABEL

The invention claimed is:

1. A manufacturing method of an optical disc for recording and/or reproducing an information signal by irradiating recording and/or reproducing light onto one principal plane of a substrate, comprising the steps of:
   molding the substrate in which concave/convex portions for an information layer have been formed on one principal plane by a stamper substrate;
   forming the information layer onto said concave/convex portions;
   forming a protecting layer having light transmitting performance onto said information layer; and
   adhering said stamper substrate or a stamper substrate used to form said concave/convex portions to another substrate onto the other principal plane of said substrate.

2. A manufacturing method of an optical disc for recording and/or reproducing an information signal by irradiating recording and/or reproducing light onto one principal plane of a substrate, comprising the steps of:
   molding the substrate in which concave/convex portions for a first information layer have been formed on one principal plane;
   forming the first information layer onto said concave/convex portions;
   coating each of said first information layer and a principal plane on which concave/convex portions of a stamper substrate have been formed with a resin material;
   forming an intermediate layer in which concave/convex portions for a second information layer have been formed onto said first information layer by semi-hardening at least one of said resin materials with which said first information layer and said stamper substrate have respectively been coated, adhering said resin materials, hardening said adhered resin materials, and subsequently peeling off said stamper substrate;
   forming the second information layer onto said intermediate layer;
   forming a protecting layer having light transmitting performance onto said second information layer; and
   adhering said stamper substrate or a stamper substrate used to form the concave/convex portions for said second information layer to another substrate onto the other principal plane of said substrate.

3. A manufacturing method of the optical disc according to claim 2, wherein
said substrate and said stamper substrate are made of the resin materials and, further, said substrate and said stamper substrate are molded in parallel by an injection molding machine having two cavities.

4. A manufacturing method of the optical disc according to claim 2, wherein
said stamper substrate is made of a material having the light transmitting performance, an ultraviolet hardening type resin is used as said resin material, and said resin material is hardened by irradiating ultraviolet rays to said resin material through said stamper substrate.

5. A manufacturing method of the optical disc according to claim 2, wherein
said stamper substrate is made of the same material as that of said substrate.

6. A manufacturing method of the optical disc according to claim 2, wherein
said substrate and said stamper substrate have almost the same thickness.

7. A manufacturing method of the optical disc according to claim 2, wherein
a thin film which is excellent in moisture proof performance and is excellent in peel-off performance with said resin material is formed onto the principal plane of said stamper substrate on which the concave/convex portions have been formed and, thereafter, said stamper substrate is coated with said resin material.

8. A manufacturing method of the optical disc according to claim 7, wherein
silicon nitride is used as a material of said thin film.

9. A manufacturing method of the optical disc according to claim 7, wherein
a film material which is used to form said first information layer or said second information layer is used as a material of said thin film.

10. A manufacturing method of the optical disc according to claim 2, wherein
said substrate and said stamper substrate are adhered so that the principal plane of said stamper substrate on which the concave/convex portions have been formed faces the outside, and a protecting layer is formed onto said principal plane.

11. A manufacturing method of the optical disc according to claim 10, wherein
a print is performed onto the protecting layer formed onto the principal plane of said stamper substrate.

12. A manufacturing method of the optical disc according to claim 2, wherein
a hard coating layer having the light transmitting performance is formed onto said protecting layer having the light transmitting performance.

13. A manufacturing method of the optical disc according to claim 2, wherein
the step of coating with said resin material, the step of forming said intermediate layer, and the step of forming said second information layer are repeated a plurality of times.

14. A manufacturing method of the optical disc according to claim 2, wherein
a plurality of said stamper substrates and/or a plurality of said stamper substrates used to form the concave/convex portions for said second information layer to another substrate are adhered onto the other principal plane of said substrate.

15. A manufacturing method of an optical disc for recording and/or reproducing an information signal by irradiating recording and/or reproducing light onto one principal plane of a substrate, comprising the steps of:
molding the substrate in which concave/convex portions for a first information layer have been formed on one principal plane;
forming the first information layer onto said concave/convex portions;
forming an intermediate layer in which concave/convex portions for a second information layer have been formed on said first information layer by coating said first information layer with a resin material having light transmitting performance, transferring concave/convex portions of a stamper substrate onto the coated resin material, and subsequently hardening said resin material;
forming the second information layer onto said intermediate layer;
forming a protecting layer having the light transmitting performance onto said second information layer; and
adhering said stamper substrate or a stamper substrate used to form the concave/convex portions for said second information layer to another substrate onto the other principal plane of said substrate.

16. An optical disc for recording and/or reproducing an information signal by irradiating recording and/or reproducing light onto one principal plane of a substrate, comprising:
the substrate in which concave/convex portions for an information layer have been formed on one principal plane by a stamper substrate;
the information layer formed on said concave/convex portions;
a protecting layer having light transmitting performance formed on said information layer; and
said stamper substrate or a stamper substrate used to form said concave/convex portions to another substrate which has been adhered to the other principal plane of said substrate.

17. An optical disc for recording and/or reproducing an information signal by irradiating recording and/or reproducing light onto one principal plane of a substrate, comprising:
the substrate in which concave/convex portions for a first information layer have been formed on one principal plane;
the first information layer formed on said concave/convex portions;
an intermediate layer in which concave/convex portions for a second information layer have been formed on said first information layer by coating each of said first information layer and a principal plane of a stamper substrate on which concave/convex portions have been formed with a resin material, semi-hardening at least one of said resin materials with which said first information layer and said stamper substrate have been coated, adhering said resin materials, hardening said adhered resin materials, and subsequently peeling off said stamper substrate;
the second information layer formed on said intermediate layer;
a protecting layer having light transmitting performance formed on said second information layer; and
said stamper substrate or a stamper substrate used to form the concave/convex portions for said second information layer to another substrate which has been adhered onto the other principal plane of said substrate.

18. An optical disc according to claim 17, wherein said substrate and said stamper substrate are made of the resin materials and, further, said substrate and said stamper substrate are molded in parallel by an injection molding machine having two cavities.

19. An optical disc according to claim 17, wherein said stamper substrate is made of a material having the light transmitting performance and said resin material is an ultraviolet hardening type resin.

20. An optical disc according to claim 17, wherein said stamper substrate is made of the same material as that of said substrate.

21. An optical disc according to claim 17, wherein said substrate and said stamper substrate have almost the same thickness.

22. An optical disc according to claim 17, wherein a thin film which is excellent in moisture proof performance and is excellent in peel-off performance with said resin material is formed onto the principal plane of said stamper substrate on which the concave/convex portions have been formed.

23. An optical disc according to claim 22, wherein silicon nitride is used as a material of said thin film.

24. An optical disc according to claim 22, wherein a film material which is used to form said first information layer or said second information layer is used as a material of said thin film.

25. An optical disc according to claim 17, wherein said substrate and said stamper substrate are adhered so that the principal plane of said stamper substrate on which the concave/convex portions have been formed faces the outside, and a protecting layer is formed onto said principal plane.

26. An optical disc according to claim 25, wherein a print is performed onto the protecting layer formed onto the principal plane of said stamper substrate.

27. An optical disc according to claim 17, wherein a hard coating layer having the light transmitting performance is formed onto said protecting layer having the light transmitting performance.

28. An optical disc according to claim 17, wherein two or more sets each comprising said intermediate layer and said second information layer are formed.

29. An optical disc according to claim 17, wherein a plurality of said stamper substrates and/or a plurality of said stamper substrates used to form the concave/convex portions for said second information layer to another substrate are adhered onto the other principal plane of said substrate.

30. An optical disc for recording and/or reproducing an information signal by irradiating recording and/or reproducing light onto one principal plane of a substrate, comprising:
the substrate in which concave/convex portions for a first information layer have been formed on one principal plane;
the first information layer formed on said concave/convex portions;
an intermediate layer in which concave/convex portions for a second information layer have been formed onto said first information layer by coating said first information layer with a resin material having light transmitting performance, transferring concave/convex portions of a stamper substrate onto the coated resin material, and subsequently hardening said resin material;
the second information layer formed on said intermediate layer;
a protecting layer having the light transmitting performance formed on said second information layer; and
said stamper substrate or a stamper substrate used to form the concave/convex portions for said second information layer to another substrate which has been adhered onto the other principal plane of said substrate.

* * * * *